Patented May 3, 1927.

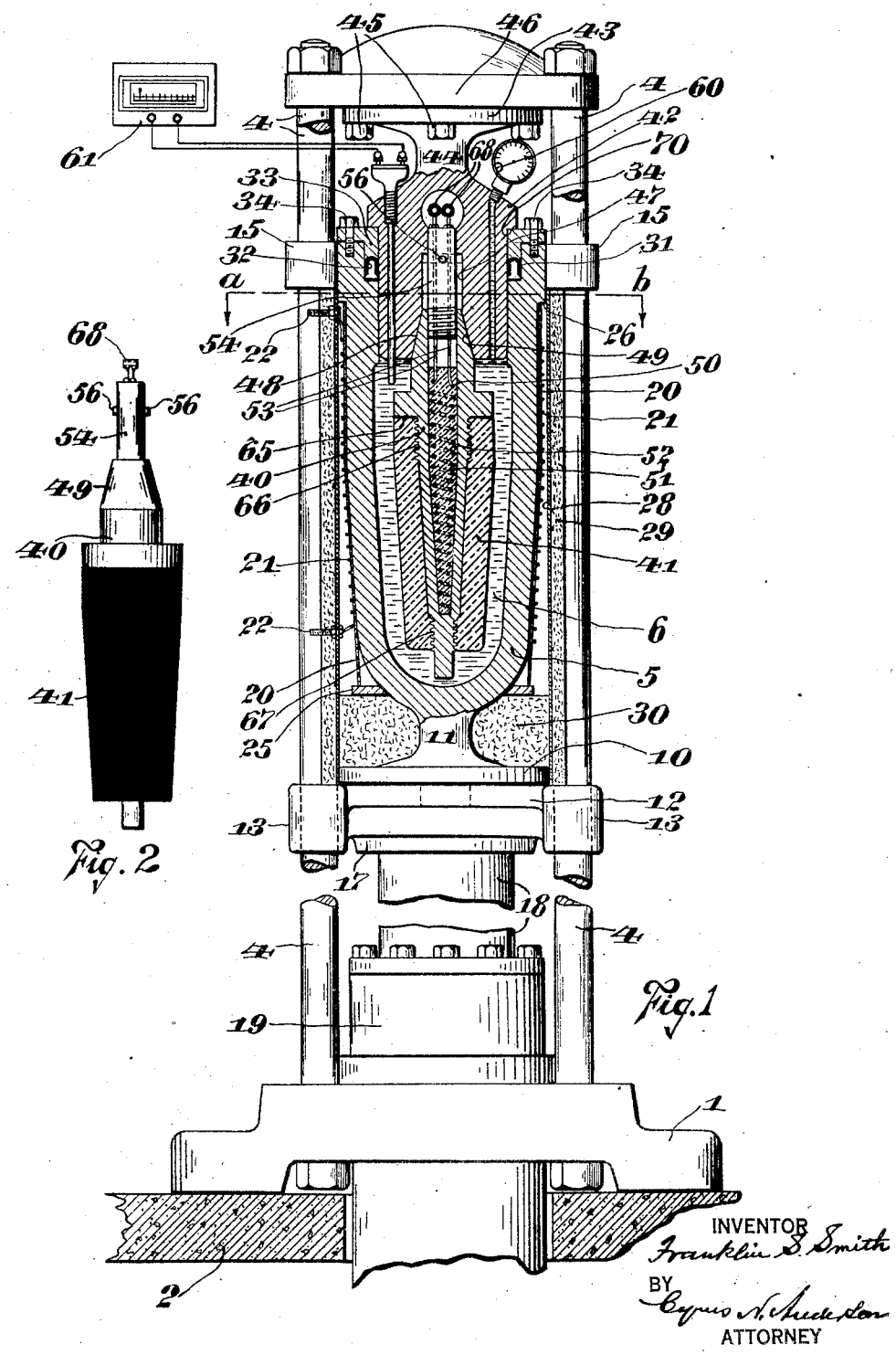

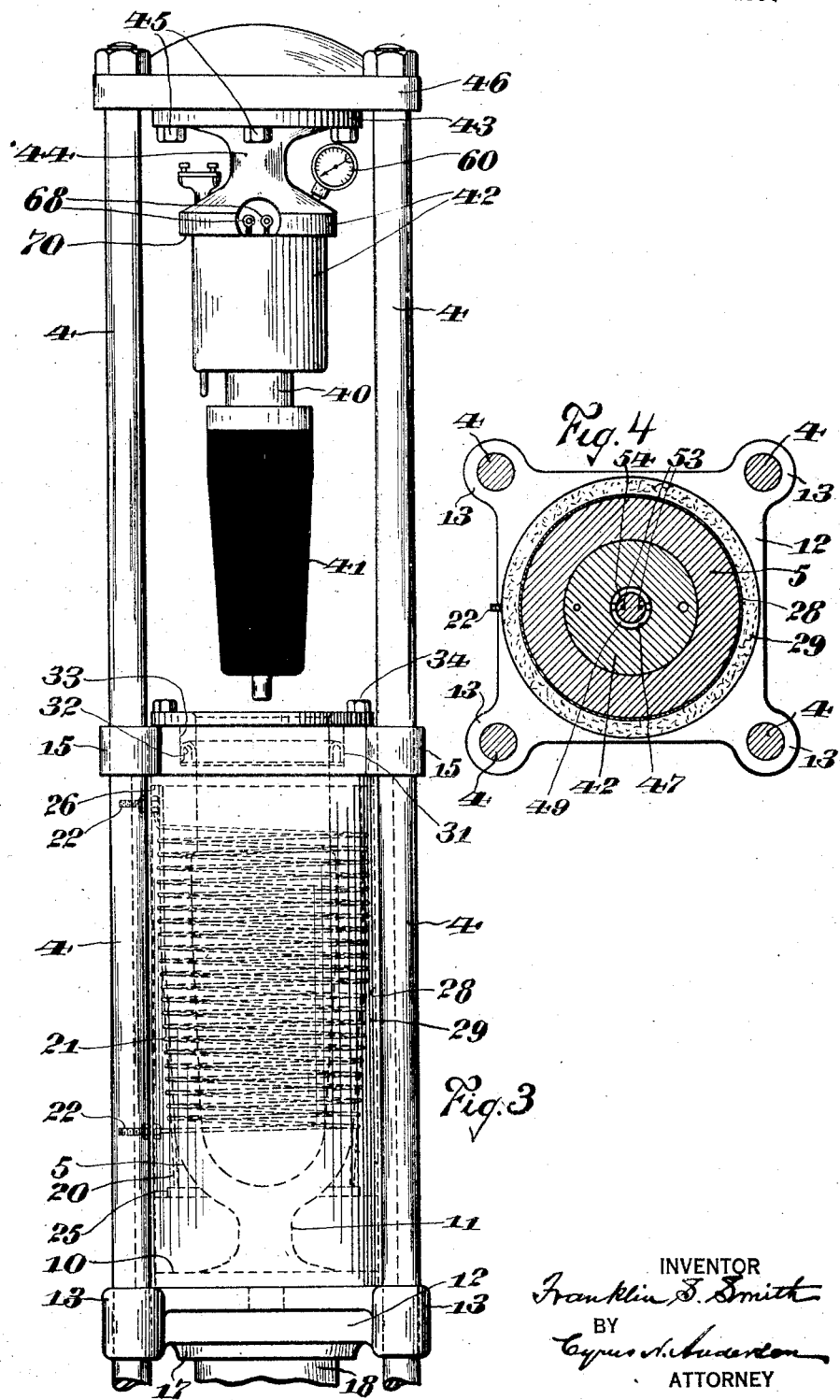

1,627,209

UNITED STATES PATENT OFFICE.

FRANKLIN S. SMITH, OF BROOKLYN, NEW YORK, ASSIGNOR TO THE PRODUCTS PROTECTION CORPORATION, OF NEW YORK, N. Y., A CORPORATION OF DELAWARE.

METHOD OF TREATING MOLDINGS OF PARTIALLY-CURED PHENOLIC CONDENSATION PRODUCT.

Application filed July 29, 1924. Serial No. 728,985.

The general object of my invention is to provide both a novel method and a novel apparatus for producing molded articles of phenolic condensation product suitable for use for the various purposes for which such product is adapted; for example, high voltage terminals for electric transformers such as are disclosed in my applications for Letters Patent, Sr. Nos. 449,212 and 544,640, filed March 2nd, 1921, and March 17th, 1922, respectively.

In use such terminals are subjected to high internal gas pressure, the said pressure being on the order of fifteen (15) atmospheres per square inch. It is essential, therefore, that the tensile strength and density of the said terminals shall be as great as possible. Likewise the dielectric strength also should be as high as possible and the external surface resistivity is of especial importance for outdoor operation. The material usually employed for molding such terminals consists of wood flour impregnated with phenolic condensation product. The frictional resistance of such mixture to flow within a mold is great even at the optimum molding temperature.

In practice all moldings of these materials made in mechanical molds are of heterogeneous density. Usually the larger the molding, that is the thicker the walls, the less uniform is the density. Such nonuniformity of density is especially apparent in large articles or moldings—for instance articles or moldings of the order of ten (10) pounds and of the configuration illustrated in the drawings of this application. By a mechanical mold is meant one in which the molding material is compressed and caused to flow by one or more plungers movable relatively to the chase of the mold.

In my application for Letters Patent of the United States filed September 15th, 1920, Sr. No. 410,456, I have disclosed a method of molding phenolic condensation product in which the mixture of wood flour and phenolic condensation product is subjected to a preheating and drying operation prior to the placing of the same in molds for molding the same into the form of such articles as may be desired. While the said method possesses many advantages over the methods previously known it is open to the objection that the articles produced thereby are not of uniform density which, however, is due to the fact that the article is molded in a mechanical mold and the curing process completed with the article therein. On account of the non-uniform density of articles of phenolic condensation product which are molded within a mechanical mold and cured therein the wall thickness of such articles, as for example high voltage terminals, must conform to that thickness which is suitable or requisite for the portion of lowest density of the molding. In the case of moldings for use as high voltage terminals the characteristic of non-uniformity present in moldings made according to previously known processes or methods necessitates a structure of considerably greater wall thickness than would be necessary if the density of the moldings were of uniform density equal substantially to the maximum density throughout the structure.

Such lack of uniformity in the density in the molded articles entails greater expense in the making of the moldings than should be necessary. One item of increased expense consists of the increased amount of material which of necessity must be used to increase the wall thickness so as to provide that at the point of least density the requisite strength shall be assured. When the molded article is cured in the mechanical mold by which it may have been formed there is not only the expense incident to the tying up of the mold during the curing process but also the expense incident to the length of time required for the curing process. These two items combined constitute the greatest item of expense involved in the methods as heretofore practiced. The principal object of my present invention, therefore, is to make better moldings, cheaper moldings and to increase the external surface resistivity thereof.

In the carrying out of the method embodying the present invention the mixture of wood flour and phenolic condensation product, form A, is subjected first to a drying and preheating process as is described in my application Sr. No. 410,456, above referred to. The mixture having been subjected to a drying and a preheating treatment at a temperature below its transition point, a little below eighty (80) degrees centigrade, it is then packed or rammed into a mechanical mold which is closed by means of an hydraulic press, and the material partially cured therein. The period of such partial curing depends primarily upon the wall thickness of the molding. A molding having a wall an inch in thickness should be kept in the mold for partial curing around ten minutes. The curing should be effected from the inside of the mold outwardly. This may be accomplished by providing that the mandrel within and upon which the molding is formed may be heated to a higher temperature than the external portion or chase of the mold. After the mixture has been placed in the mold, as above described, the temperature is raised to a temperature sufficient to transform product A to product C, say on the order of 140° C.

After the molding has been partially cured in the mold in which it is formed it is removed with the mandrel and quickly (to avoid temperature drop) placed within a liquid which preferably should be chemically neutral with respect to the material of which the molding is composed and of greater viscosity than water. It is desirable that the liquid used should be relatively viscous as otherwise it would tend to seep in between the mandrel and the product under treatment as will be apparent in the following. It is essential that this material should be a liquid at the temperature of treatment and a solid at normal atmospheric temperatures at which the finished product is to be used. Such liquid preferably consists of "cumar," a dielectric, which is a synthetic resin produced from coal tar distillates. Chemically it is a mixture of para-coumarone, para-indene and the polymers of other hydrocarbons found in coal tar. At normal atmospheric temperature "cumar" is a solid but at the temperature at which the curing is effected, one hundred and forty (140) degrees centigrade or higher, the said substance is a liquid of sufficient viscosity. Instead of "cumar" chlorinated napthalene (known in the trade as "halowax") also a dielectric may be employed.

Whether the one or the other of these substances is employed the said substance is placed in a receptacle of the static press and when melted the molding with the mandrel upon which it is molded and carried in its original relative position is inserted and supported within the receptacle of said static press, the said molding being submerged in the hot liquid. The said liquid is then very quickly subjected to a static pressure on the order of one ton per square inch. The static pressure must be applied quickly otherwise the liquid will seep in between the mandrel and the product under treatment. By the use of this viscous liquid and by a quick application of the static pressure, the use of the rubber or other packing usual in hydrostatic pressing of materials is eliminated. The molding is left in this liquid under pressure and at a temperature of around one hundred and forty (140) degrees centigrade or higher until the curing is effected.

Although I have mentioned specifically "cumar" and chlorinated napthalene as suitable materials to be employed for the formation of the liquid within which the molding is to be submerged and cured, it should be understood that any other relatively viscous liquid suitable which is chemically neutral with respect to the material of the molding may be employed.

The liquid employed, however, preferably should be one of such character that it will combine mechanically with the external surface of the molding and it should preferably be of such character that the surface resistivity of the molding will be increased by the incorporation of the outer portion of the molding with portions of the material within which the curing is effected. The extent to which the liquid within which the curing is effected may penetrate the molding may be controlled by the extent of the curing of the said molding within the mechanical mold before subjecting the same to the action of the liquid under static pressure, as above described.

The mechanical bond which is effected during the curing operation between the molding material and the "cumar" appears to be lasting. The resultant surface is speckled, that is, there are many small isolated specks of "cumar" which add greatly to the surface resistivity and tend to prevent wetting of the molded article when it is subjected to the weather. The surface in that respect has somewhat the characteristic of a wax.

A further advantage incident to the use of "cumar" as the material in which the curing is effected is that it is a completely polymerized substance which is a desirable characteristic of the material employed in the curing process of a molded phenolic condensation product.

In the preceding portion of this specification I have described the method embodying my invention in a general way without referring to mechanism but obviously some form of mechanism is necessary in practice to carry out the invention commercially and I have, therefore, provided an apparatus which may be employed in the carrying out of the method. The machine or apparatus employed by me is believed to be novel but it will be understood that the method, as above described, and which embodies my invention is not limited to any particular kind or form of mechanism but may be carried out by the use of any apparatus or machine which may be suitable and adapted to that end.

In the drawings Fig. 1 is a view partly in vertical central section and partly in side elevation of a static press adapted for the curing of phenolic condensation products;

Fig. 2 is a view in side elevation of a molding carried by a mandrel such mandrel being the interior member of the mechanical mold;

Fig. 3 is a view in side elevation of the static press with the parts in different positions from that shown in Fig. 1; and Fig. 4 is a transverse sectional view taken on the line a—b of Fig. 1.

Referring to the drawings, 1 designates a base which is supported upon a concrete or other support 2. A frame structure comprising four guide rods 4 is mounted upon the base 1. Movably mounted and supported upon the guide rods 4 is a structure comprising an exterior member 5 which is adapted to receive and hold the heated liquid 6 such as "cumar," "halowax" or other suitable liquid. The exterior member 5 is provided with a base 10 connected thereto by means of a reduced neck-portion 11. The purpose of reducing the connection as indicated is to limit as far as it is practicable the conduction of heat from the static press. The base 10 is connected with and is supported upon a platform or support 12 which is provided with projecting sleeves 13 at its four corners through which the four guide rods 4 extend. The exterior member 5 of the press is also provided adjacent its upper end with laterally and outwardly extending sleeve-like projections 15 through which also the guide rods 4 extend.

The support or platform 12, previously referred to, rests upon the upper end or head 17 of the plunger or piston of a hydraulic press, the cylinder of which is indicated at 19. The reciprocating movements of the plunger or piston 18 cause like movements of the platform or support 12 together with the exterior member of the press and certain parts carried thereby.

The exterior member 5 of the press is surrounded by a tubular casing 20 of insulating material which in turn is surrounded by a resistance coil 21, the opposite ends of which are connected to the binding posts 22. Upon the passage of current through this coil 21 it is heated and the heat is transmitted to the exterior member 5 of the press to effect heating thereof and of the liquid 6 therein. The lower end of the tubular insulating casing 20 rests upon the upper side of a flange 25 extending laterally from the lower end portion of the member 5, while the upper end thereof contacts with an annular shoulder 26 upon the outer end portion of the said member 5. The resistance coil 21, previously referred to, is inclosed within and spaced from a tubular casing 28 which extends between the platform or support 12 and the laterally projecting sleeves 15. The tubular casing 28 is surrounded by a relatively thick layer or structure 29 of heat insulating material such as asbestos fiber. A body of heat insulating material 30 is also provided within the lower portion of the casing 28 above the base 10 and below the flange 25 and surrounding the neck-portion 11 of the press member 5.

The inner edge portion of the upper end of the exterior member 5 of the press is provided with a cut-out portion 31 within the lower end of which is seated packing member 32 which consists of a strip of leather or other suitable material bent so that it is of inverted U shape in cross section. The said packing is held in place by a gland 33 secured by means of screw-threaded bolts 34 to the upper end of the member 5.

The press comprises an interior member 40 constituting a mandrel for the molding 41. As already pointed out herein the molding 41 is first formed upon the mandrel 40 in a molding apparatus of the usual and well known type within which the molding 41 is given a preliminary curing on the order of ten minutes duration at the chosen temperature after which the mandrel 40 with the molding thereon is removed and mounted upon the stationary member 42 having a base 43 connected thereto by a reduced neck-like portion 44 corresponding to the similar portion 11. The base 43 is secured by means of bolts 45 to a cross head 46 at the upper end of the guide rods 4. The stationary member 42 is provided with a central opening 47 the lower end of which is tapered as indicated at 48. The tapered upper end portion 49 of the mandrel 40 is adapted to be seated against the said tapered portion 48 to completely close the entrance to the opening 47. The interior of the mandrel 40 is bored out, as indicated at 50, so that it is hollow. The lower end of the opening in the mandrel is tapered as indicated to correspond with the exterior taper thereof. Mounted within the interior of the mandrel 40 and filling the same is a body of suitable insulating material 51 within which is imbedded a resistance coil 52. The opposite upper ends 53 of the said coil pass through an extension member 54 secured in the open outer end of the bore or opening 50. The said upper ends 53 are insulated from the said extension member and from each other. The opening 47 is provided with a bayonet like slot which is adapted to be engaged by the projections 56 upon the extension 54 whereby the mandrel 40 with or without the molding 41 thereon is adapted to be supported in position upon the lower end of the stationary member 42. When the mandrel 40 is in position, as shown in Figs. 1 and 3 of the drawings, the upper ends 53 of the coil 52 are in contact or in communication with line wires by means of which electric current is supplied to the said resistance coil 52.

For the purpose of indicating the pressure which may be created within the press I have provided a pressure gauge 60 and for indicating the temperature of the liquid 6 I have provided a pyrometer indicated as a whole at 61.

It will be observed that the mandrel 40 is provided with a shoulder 65 intermediate its ends by which the upper end of the molding is formed and against which it is seated, as shown in the drawing. Adjacent the shoulder 65 the said mandrel is provided with external screw-threads 66, the presence of which effects the formation of interior screw-threads adjacent the end of the interior of the molding. Adjacent its small end the mandrel 40 is also provided with external screw-threads 67 the presence of which effects the formation of the internal screw-threads in the opposite reduced end portion of the molding 41.

The particular molding disclosed is intended for use in connection with high voltage terminal structures and the internal screw-threaded portions are provided for the purpose of making certain necessary attachments.

In the operation of the apparatus and in the carrying out or practicing of the method the molding is first molded upon the mandrel 40, or a similar mandrel in a mechanical mold and given a preliminary curing treatment therein, as above described. In this preliminary curing operation the interior of the mold, that is to say, the mandrel should be at a higher temperature than the exterior mold member in order that the curing may proceed from the interior toward the exterior of the molding.

The preliminary curing having been completed the mandrel with the molding thereon as shown in Fig. 2 is transferred to an apparatus such as illustrated and is secured in place upon the stationary member 42 with the outer upper terminals 68 of the extensions 53 of the resistance wire 52 in contact or engagement with the line wires which communicate with the source of electric current supply not shown. The exterior member 5 of the press having been previously supplied with a suitable material, such as "cumar", is heated, the "cumar" liquefied and maintained at the desired temperature. This material constitutes the liquid 6. The member 5 is then elevated by means of the plunger 18 so that the molding is submerged within the said liquid 6. By reason of the upward movement of the external member 5 of the press the stationary piston like member 42 is caused to enter the upper end thereof, as shown in Fig. 1 of the drawings, so that the liquid 6 within the member 5 may be and is subjected to great pressure, the pressure being on the order of two thousand pounds per square inch. It may be noted here that the upward movement of the member 5 under the influence of the ram or piston 18 is adapted to be limited by the shoulder 70 near the upper end portion of the member 42.

The molding having been submerged within the liquid 6 is retained therein under the pressure indicated during the period that the curing is being effected which may be several hours, the length of time depending upon the thickness of the molding. The curing should be effected at a temperature on the order of 140 degrees. As already indicated, during the preliminary curing in the mechanical mold in and by which the molding is originally formed the temperature of the interior should be greater than that of the exterior in order that the curing or change of form may take place from the interior towards the exterior of the molding. When the curing is effected in this manner the gases which may be present within the body of the material of which the molding is composed are caused to escape outwardly through the molding while it is in a permeable condition. By this method the formation of porous or defective portions is prevented. Likewise during the curing operation within the apparatus disclosed and described herein the mandrel 40 should be maintained at a higher temperature than that of the external member 5 of the press.

After the curing of the molding has been completed the ram or piston 18 is lowered so as to lower the external member of the mold structure. The mandrel 40 is then disengaged and removed from the stationary piston-like member 42 and while the molding 41 is still hot it is turned so as to remove or back it off of the mandrel 40. The molding is then cooled very slowly to room temperature.

It will be observed that in the carrying out of the method embodying my invention the interior of the molding is shaped by the mandrel from which it is not removed until the curing thereof has been completed so that the inner surface which in the molding as illustrated is the important surface is maintained in its original accurate shape and contour.

Having thus described my invention what I claim and desire to secure by Letters Patent is:

1. The method of treating moldings of phenolic condensation product which comprises partially curing the same in a mechanical mold, removing said molding from the said mold and placing it within a liquid dielectric of greater viscosity than water and simultaneously subjecting the same to heat and pressure, the pressure causing a portion of said dielectric to penetrate said molding.

2. The method of treating moldings of phenolic condensation product which comprises partially curing the same in a mechanical mold, removing the molding from the said mold and placing it within a liquid, heating the said liquid, heating the interior of the said molding to a higher temperature than that of the said liquid and subjecting the liquid to high pressure.

3. The method of treating moldings of phenolic condensation product which comprises partially curing the same in a mold, removing the molding from the said mold and submerging it within a body of liquid chemically neutral to the material of the said molding, heating the said molding both from the interior and the exterior, the temperature of the interior being greater than that of the exterior, and subjecting the said liquid to pressure to cause portions thereof to enter and become impregnated with the outer portions of the material of the said molding.

4. The method of treating moldings of phenolic condensation product which comprises partially curing the same in a mechanical mold, removing the molding from the said mold and submerging it in a hot liquid which is chemically neutral to the said phenolic condensation product, confining the said liquid within a static press, heating the molding from the interior and the exterior and subjecting the said liquid to a pressure on the order of two thousand pounds per square inch.

5. The method of treating moldings of phenolic condensation product which comprises partially curing the same in a mechanical mold, removing the molding in place upon mandrel of said mold from the said mold and submerging it together with said mandrel within a body of liquid which is chemically neutral to the material of the said molding, maintaining the liquid at a temperature of sufficient height to convert the said material to product C and simultaneously subjecting the same to high pressure to cause a portion thereof to penetrate into the body of the said material and to effect the cure thereof.

6. The method of treating moldings of phenolic condensation product which comprises partially curing the same in a mechanical mold, removing the molding and mandrel from the said mold and submerging it within a body of liquid which is neutral to the material of the said molding, maintaining the liquid at a temperature of approximately 140° centigrade and causing portions thereof to penetrate into the body of the said molding.

7. The method of treating moldings of phenolic condensation product which comprises partially curing the same in a mechanical mold, removing the molding from the said mold and submerging it within a body of molten "cumar" maintaining the latter at a temperature of approximately 140° centigrade and causing portions thereof to penetrate into the body of the said molding.

8. The method of treating moldings of phenolic condensation product which comprises partially curing the same in a mechanical mold, removing the molding from the said mold and submerging it within a hot liquid which is chemically neutral to the material of the molding, simultaneously heating the interior of the said molding and the said liquid, the temperature of the interior of the said molding being greater than that of the liquid and the said temperature being approximately 140° centigrade and causing portions of the said liquid to penetrate and combine with a part of the surface of the said body of the said molding.

9. The method of treating moldings of phenolic condensation product which comprises partially curing the same in a mechanical mold, removing the molding from the said mold and submerging same within a body of liquid consisting of molten material of a character which is neutral to the material of the said molding, maintaining the said liquid at a temperature sufficient to transform product A to product C, heating the interior of the said molding to a temperature greater than that of the said liquid, subjecting the said liquid to high pressure to cause the said liquid to penetrate into a part of the material of the said molding and maintaining the interior surface of the said molding against distortion.

10. The method of treating moldings of phenolic condensation product which comprises supporting the molding upon a mandrel and submerging the same within a body of molten "cumar" within a static press, applying heat to the said molten "cumar" to maintain the same at a temperature of approximately 140° centigrade, applying heat to the interior of the molding to maintain it at a temperature greater than that of the temperature of the exterior of the molding and subjecting the molten "cumar" to a pressure on the order of two thousand pounds per square inch.

11. The method of treating moldings of phenolic condensation product which consists in submerging the same within a liquid dielectric, maintaining the said liquid at a temperature of approximately 140° centigrade, and simultaneously subjecting the said liquid and the molding therein to high pressure, the pressure causing a portion of said dielectric to penetrate said molding.

12. The method of treating partially cured moldings of phenolic condensation product which consists in submerging a molding within a suitable liquid dielectric, supporting the said molding interiorly, maintaining the said liquid and the said molding at a temperature of approximately 140° centigrade and simultaneously subjecting the said liquid to high pressure, and heating the mold interiorly.

13. The method of treating partially cured moldings of phenolic condensation product which consists in submerging a molding within a volume of molten "cumar", maintaining the said "cumar" and the said molding at a temperature of approximately 140° centigrade and causing portions of the "cumar" to penetrate into the body of said molding.

14. The method of treating partially cured moldings of phenolic condensation product which consists in submerging a molding within a volume of molten "cumar", maintaining the said "cumar" and the said molding at a temperature of approximately 140° centigrade and simultaneously subjecting the said molten "cumar" to a pressure of the order of two thousand pounds per square inch.

15. The method of treating partially cured moldings of phenolic condensation product which consists in submerging a molding within a volume of liquid neutral to the said molding, supporting the said molding interiorly, maintaining the said liquid and the said molding at a temperature of approximately 140° centigrade and subjecting the liquid to a pressure of the order of two thousand pounds per square inch.

16. The method of treating partially cured phenolic condensation products of heterogeneous density, which consists in subjecting the product to the action of a chemically neutral liquid dielectric of greater viscosity than water, under pressure on the order of a ton per square inch and at a temperature on the order of 140° C., the pressure causing a portion of said dielectric to penetrate said molding.

17. The method of treating a partially cured phenolic condensation product of heterogeneous density, which consists in subjecting the product to the action of a dielectric material under heat and static pressure, the said material being in a viscous liquid state during said treatment, and becoming a solid at normal atmospheric temperature, the pressure causing a portion of said dielectric to penetrate said molding.

18. The method of treating a partially cured phenolic condensation product of heterogeneous density which consists, in subjecting the product to the temperature and pressure actions of a completely polymerized chemically neutral liquid dielectric, the temperature and pressure of said liquid being sufficient to transform product A to produce C, to cause a portion of said dielectric to penetrate said molding and to effect an increased and substantially homogeneous density of said product.

19. The method of treating a partially cured phenolic condensation product of heterogeneous density which consists in subjecting the product to sufficient temperature, pressure and impregnating actions of a completely polymerized chemically neutral material for sufficient time to transform product A to product C to effect an increased and substantially homogeneous density, and to superficially impregnate the exposed surface of said product, and in slowly cooling said treated product to a normal atmospheric temperature, the said material being a liquid during treatment and becoming a mechanically bonded solid in the impregnated portion of the treated product when cooled to said normal temperature.

In testimony that I claim the foregoing as my invention, I have hereunto signed my name this 22nd day of July, A. D., 1924.

FRANKLIN S. SMITH.